UNITED STATES PATENT OFFICE.

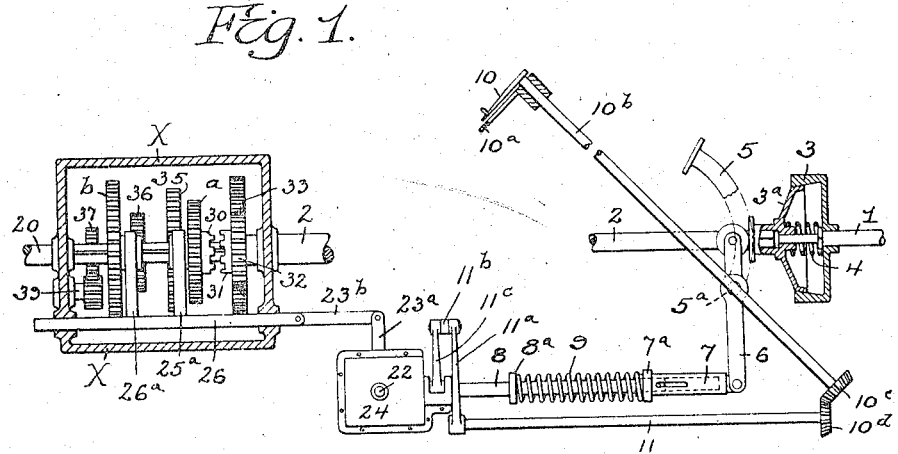
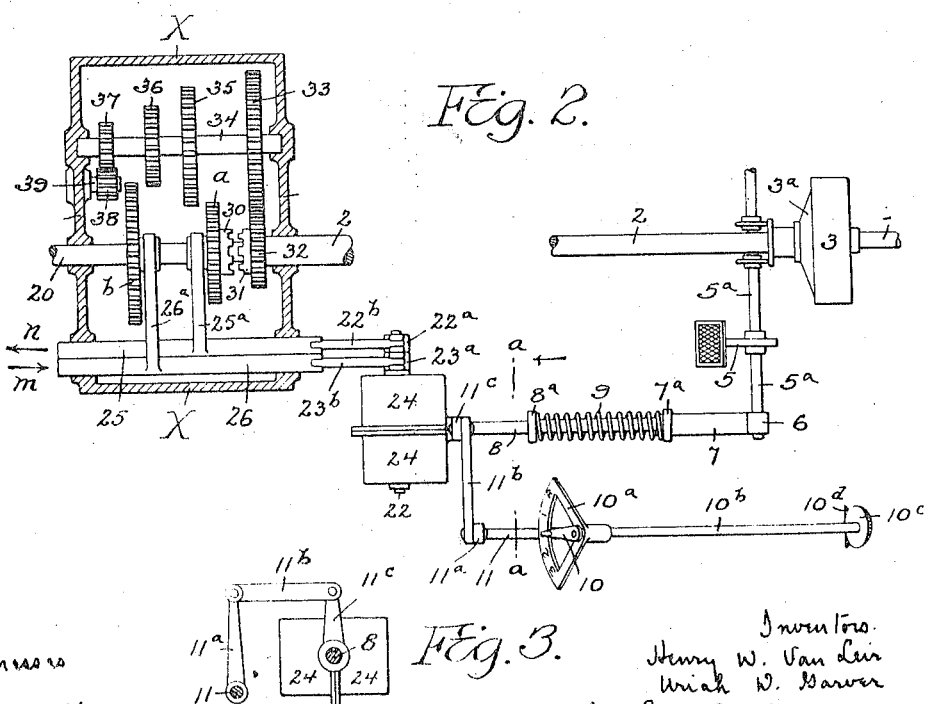

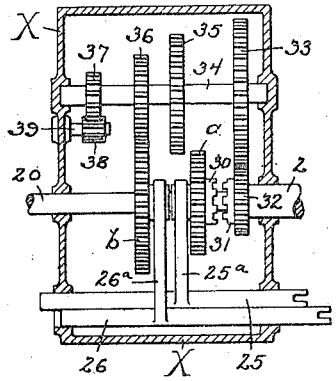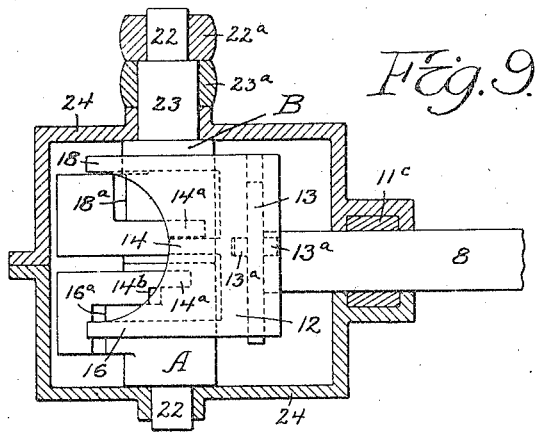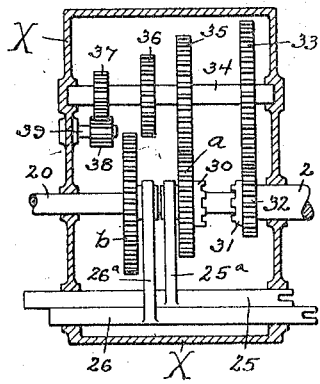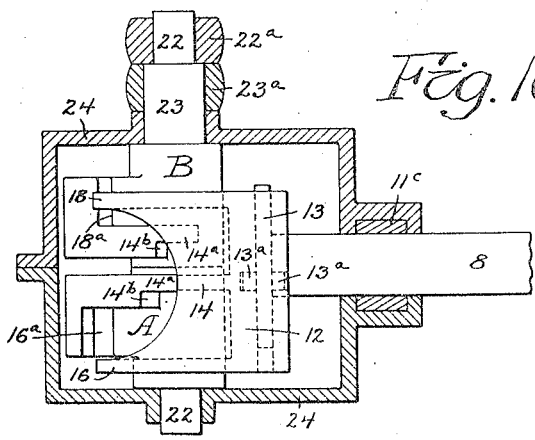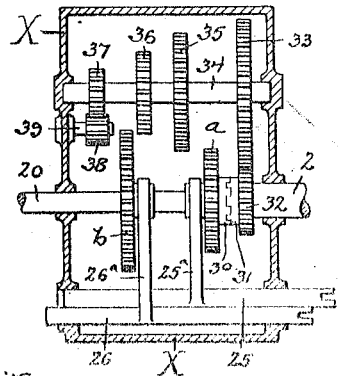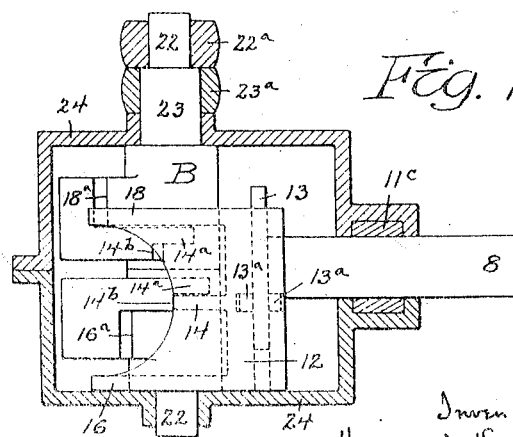

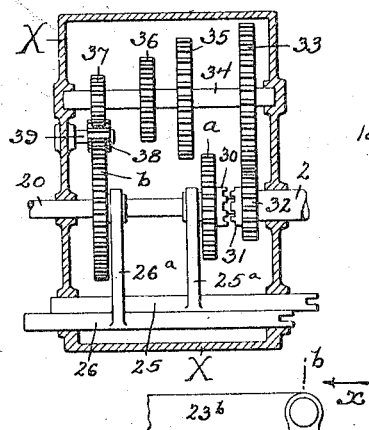
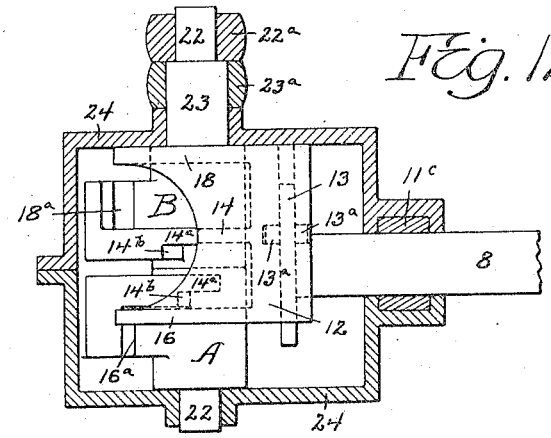
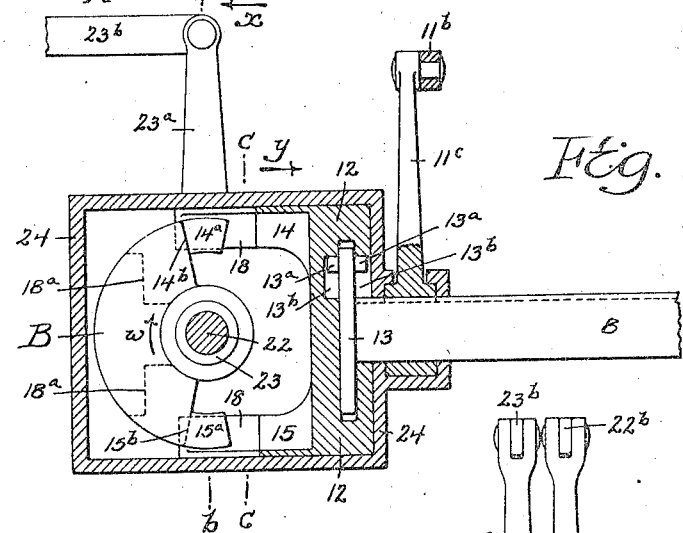
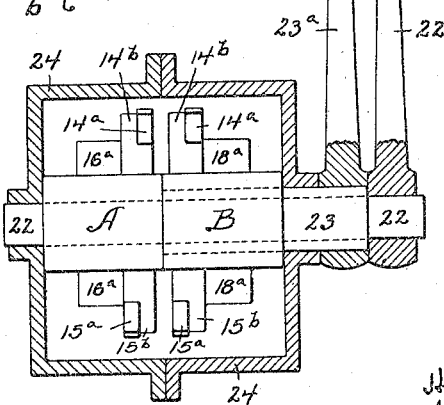

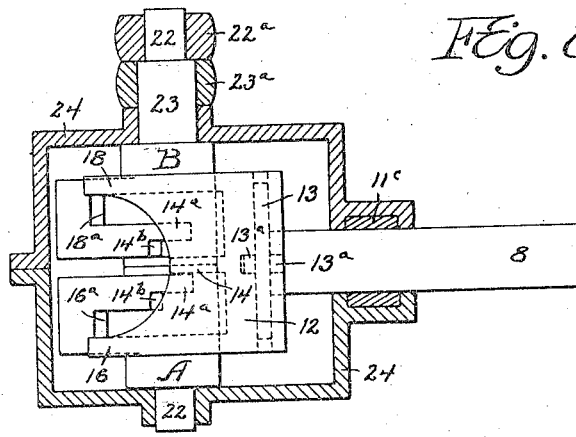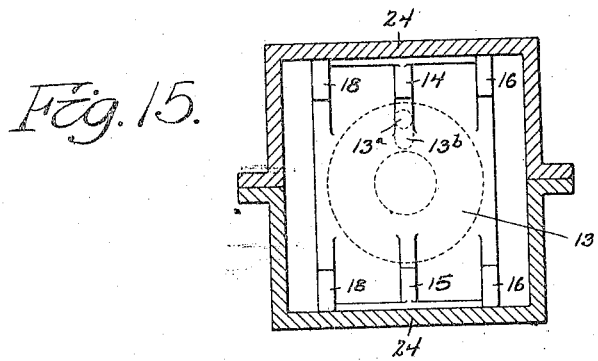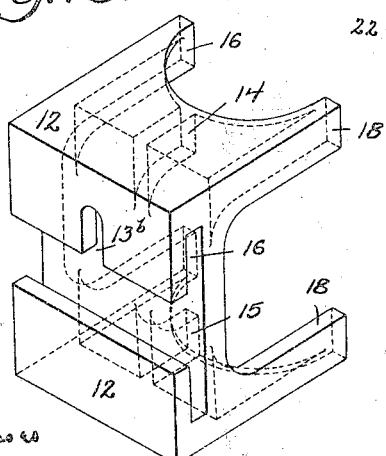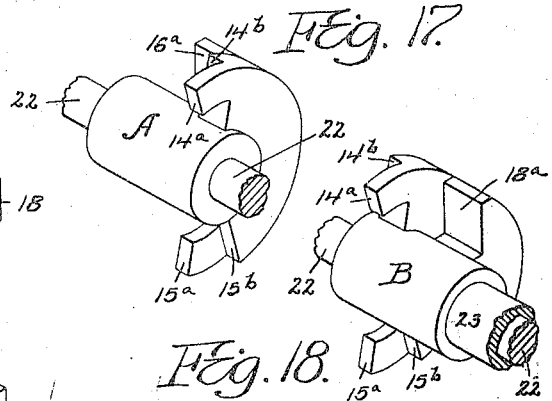

HENRY W. VAN LEIR AND URIAH D. GARVER, OF PHILADELPHIA, PENNSYLVANIA; SAID GARVER ASSIGNOR TO SAID VAN LEIR.

SPEED-CHANGING MECHANISM.

1,148,264.  Specification of Letters Patent.  Patented July 27, 1915.

Application filed July 16, 1914. Serial No. 851,339.

*To all whom it may concern:*

Be it known that we, HENRY W. VAN LEIR and URIAH D. GARVER, citizens of the United States, residing in Philadelphia, Pennsylvania, have invented certain Improvements in Speed-Changing Mechanism, of which the following is a specification.

Our invention relates to that type of speed changing mechanism in which shifting gears are employed, the objects of our invention being to insure the disengagement of one set of gears before another set of gears can be moved into engagement, and to prevent engagement of either set of gears unless the controlling device has been properly set to effect one or other of the various combinations.

These objects we attain in the manner hereinafter set forth, reference being had to the accompanying drawings, in which our invention has been shown as applied to the speed changing mechanism of a motor car, Figure 1 being a diagrammatic view, partly in section and partly in elevation, showing those parts of the gear selecting and shifting mechanism to which our invention particularly relates; Fig. 2 a top or plan view of the same, partly in section; Fig. 3 a section on the line $a$—$a$, Fig. 2, looking in the direction of the arrow; Figs. 4, 5, 6 and 7 views of the change gears in the respective operative positions assumed by them; Fig. 8 a plan or top view of the selecting and gear shifting devices in the positions assumed by them in order to adjust the gears to the inoperative or neutral position shown in Fig. 2; Figs. 9, 10, 11 and 12 similar views showing the gear selecting and gear shifting devices in the positions assumed by them in order to adjust the gears to the different operative positions shown in Figs. 4, 5, 6 and 7, respectively; Fig. 13 a view, partly in elevation and partly in longitudinal section, through the gear selecting and shifting devices; Fig. 14 a view, partly in elevation and partly in transverse section, on the line $b$—$b$, Fig. 13, looking in the direction of the arrow $x$; Fig. 15 a view, partly in elevation and partly in transverse section, on the line $c$—$c$, Fig. 13, looking in the direction of the arrow $y$; Fig. 16 a perspective view of the gear selecting device, and Figs. 17 and 18 perspective views of the gear shifting devices.

Referring in the first instance to Figs. 1, 2 and 3 of the drawings, 1 and 2 represent the forward and rear portions of the engine shaft of the car between which are interposed the members 3 and $3^a$ of a clutch, these members being normally moved into engaging relation with one another by means of the spring 4 and being separated so as to disconnect the two sections of the engine shaft by means of a clutch pedal 5 which is mounted upon a shaft $5^a$, the latter being also provided with arms carrying rollers which bear upon the outer face of the hub of the member $3^a$ of the clutch, as shown in Figs. 1 and 2. The shaft $5^a$ is also provided with an arm 6 having pivotal connection with one end of a sleeve 7 which embraces a shaft 8 and is free to slide longitudinally thereon, a coiled spring 9 interposed between a collar $8^a$ on the shaft and a collar $7^a$ on the sleeve serving to transmit longitudinal movement from the sleeve to the shaft when said sleeve is moved rearwardly by the arm 6 on such operation of the clutch pedal 5 as will disconnect the clutch members 3 and $3^a$.

Besides being moved longitudinally in the manner described, the shaft 8 can also have movement of partial rotation imparted to it by means of an indicator arm 10 operating in conjunction with a dial $10^a$ and carried by the upper end of a shaft $10^b$ which is mounted in bearings so disposed that the indicator arm 10 will be located in a position convenient for manipulation by the driver of the car, preferably in a position adjacent to the steering wheel. The lower end of the shaft $10^b$ is connected, by means of bevel wheels $10^c$ and $10^d$, or equivalent connections, to a horizontal shaft 11 which is provided at its rear end with an arm $11^a$, the latter being connected by a link $11^b$ to an arm $11^c$ whose hub is splined upon or otherwise connected to the shaft 8 so as to impart movements of partial rotation thereto without interfering with the longitudinal movement thereof. The shaft 8 is provided at its rear end with means for imparting both longitudinal and lateral reciprocating movement to a selector head 12, and various means may be employed for this purpose, the means which I have shown in the drawing comprising a disk 13 secured to the rear end of the shaft 8 and fitting in a grooved or slotted portion of the selector head so as to cause the latter to move longitudinally with the shaft, said disk having crank pins 13ᵃ engaging with slots 13ᵇ in the selector head so that movement of rotation of the shaft 8 in either direction will cause corresponding lateral reciprocation of said selector head.

The selector head has three pairs of projecting arms 14—15, 16—16 and 18—18, disposed on opposite sides of the horizontal center of the head, as shown in Fig. 16 and these arms coöperate with certain dogs on rocking shifters A and B which are connected, in the manner hereinafter described, to the shifting members of the gear trains whereby power is transmitted from the engine shaft 2 to the transmission shaft 20 and by the latter to the rear driving axle of the machine.

The number and character of the speed changing gears employed will depend largely upon the number of different speeds which it is desired to provide for. The gears which we have shown in the present instance are intended to provide for three speeds ahead and one reverse, and are as follows: Secured to the engine shaft 2 is a spur wheel 32 which meshes with a spur wheel 33 on a counter-shaft 34, the latter also having three other spur wheels 35, 36 and 37, differing in diameter from each other, the spur wheel 37 meshing with a pinion 38 which is free to turn on a stud 39 in the gear case X. The inner end of the transmission shaft 20 has a bearing in the end of the shaft 2 which is bored out for this purpose, and splined or otherwise mounted upon the transmission shaft so as to be free to move longitudinally thereon but incapable of rotating independently thereof, are shifting gears a and b, the gear a being also provided with a clutch member 30 which is adapted to engage with a clutch member 31 on the face of the engine shaft spur wheel 32, as shown in Figs. 1 and 2.

Each of the gears a and b is capable of assuming three different positions on the transmission shaft 20, depending upon the character of the movement to be imparted to said shaft or whether any movement at all is to be imparted thereto, and we will now describe the means whereby the movements of the gears a and b are effected by the action of the arms of the selector 12 upon the shifters A and B.

Each of the shifting devices A and B has above the center shifting dogs 14ᵃ and locking dogs 14ᵇ for the action of the upper arm 14 of the selector head and below the center shifting dogs 15ᵃ and locking dogs 15ᵇ for the action of the lower arm 15 of said selector head. The shifter A has upper and lower neutralizing dogs 16ᵃ for the action of the upper and lower arms 16 of the selector head, and the shifter B has upper and lower neutralizing dogs 18ᵃ for the action of the upper and lower arms 18 of the selector head. The shifting dogs 14ᵃ and 15ᵃ project forwardly beyond the locking dogs 14ᵇ and 15ᵇ, and said dogs are reversed in position laterally, that is to say, the upper shifting dog 14ᵃ is in line laterally with the lower locking dog 15ᵇ and the lower shifting dog 15ᵃ is in line laterally with the upper locking dog 14ᵇ, the neutralizing dogs 16ᵃ and 18ᵃ being laterally out of line with the dogs 14ᵃ, 14ᵇ, 15ᵃ and 15ᵇ.

The shifter A is employed in connection with the shifting gear a and is connected thereto by the following means: The shifter A is secured to a shaft 22 which is mounted at one end in a bearing in the casing 24 and at the other end in a sleeve 23 which in turn is mounted in said casing 24, the end of the shaft 22 projecting beyond the sleeve 23 and being provided with an arm 22ᵃ which is connected by a link 22ᵇ to a bar 25 mounted so as to be free to slide in the gear case X and having an arm 25ᵃ which engages the grooved hub of the shifting gear a, as shown in Fig. 2. In like manner the shifter B is secured to the sleeve 23 and the latter has at its outer end an arm 23ᵃ which is connected by a link 23ᵇ to a bar 26, likewise mounted so as to slide in the gear case X and having an arm 26ᵃ which engages the grooved hub of the shifting gear b.

In the following description of the operation of the mechanism the terms "right" and "left" are assumed to be right and left in respect to the driver of the car facing the indicator in Figs. 1 and 2.

When both the gears a and b are in the intermediate or neutral position shown in Fig. 2, the indicator arm 10 is likewise in the central or neutral position shown in said figure, the selector head also occupies a central position so that if it is moved rearwardly, as shown in Fig. 8, while in this position the arms 14 and 15 will pass between the shifters A and B and will have no effect thereon. The arms 16 and 18 are then in position to act upon the dogs 16ᵃ and 18ᵃ but the latter are in the intermediate position shown in Fig. 13 and the arms 16 and 18 will clear the same.

If the indicator arm 10 is moved from the central or neutral position one point to the left to indicate first speed ahead the selector head will be moved one step to the left from its central or neutral position so as to bring its lower arm 15 into line with the lower dog 15ᵃ and its upper arm 14 into line with the upper dog 14ᵇ, consequently, when the selector head is moved rearwardly, as shown in Fig. 9, the shifter B will, by reason of the contact of the lower arm 15 with the dog 15ᵃ, be moved in the direction of the arrow *w* shown in Fig. 13 until the upper dog 14ᵇ contacts with the upper arm 14. At this time the arms 18 are laterally beyond the limits of the shifter B so that the dogs 18ᵃ will not interfere with the above described movement, the effect of which is to move the arm 23ᵃ and its gear controlling bar 26 in the direction of the arrow *m*, Fig. 2, so as to bring the gear *b* into mesh with the spur wheel 36, as shown in Fig. 4, thereby driving the transmission shaft 20 forwardly at the slowest or first speed. If the indicator arm 10 is moved to the first position to the right of the center the selector head 12 will be moved one step to the right of the center, the upper arm 14 being then in line with the dog 14ᵃ of the shifter A and the lower arm 15 in line with the dog 15ᵇ of said shifter, the arms 16 being at the same time moved laterally beyond said shifter A and the arms 18 being moved into position to engage the dogs 18ᵃ of the shifter B. The first effect, therefore, of the rearward movement of the selector head, as shown in Fig. 10, will be to cause the arms 18 to act upon the dogs 18ᵃ and move the shifter B so as to restore the parts connected thereto to the neutral position shown in Fig. 2, and as soon as this has been done the arm 14 will act upon the dog 14ᵃ of the shifter A so as to move the bar 25 in the direction of the arrow *n*, Fig. 2, thereby carrying the shifting gear *a* into mesh with the spur wheel 35, as shown in Fig. 5, so as to drive the shaft 20 forwardly at the second speed.

Movement of the indicator arm 10 one point farther to the right will have the effect of moving the selector head 12 to the position at the extreme right so as to bring its upper arm 14 into line with the dog 14ᵇ and its lower arm 15 into line with the dog 15ᵃ, the arms 16 being still free from the dogs 16ᵃ so as not to interfere with further movement of the shifter A, and the arms 18 being still in position to engage the dogs 18ᵃ so that on the backward movement of the selector head, as shown in Fig. 11, the shifting gear *b* will still be retained in the neutral position shown in Fig. 2 but the bar 25 will be moved from the position shown in Fig. 5 to that shown in Fig. 6, first carrying the shifting gear *a* out of mesh with the spur wheel 35 and then engaging the clutch members 30 and 31 so as to connect the transmission shaft 20 directly to the engine shaft 2 and drive said transmission shaft forwardly at the highest speed. Movement of the indicator 10 to the extreme position at the left of the dial 10ᵃ indicated at R in Fig. 2 will cause adjustment of the selector head 12 to the extreme left position, that is to say, with the arm 14 in line with the dog 14ᵃ of the shifter B, the arm 15 in line with the dog 15ᵇ of said shifter, the arms 16 in line with the dogs 16ᵃ of the shifter A, and the arms 18 out of line with the dogs 18ᵃ of the shifter B. The first effect of the rearward movement of the selector head 12, as shown in Fig. 12, therefore, is to cause the arms 16 to act upon the dogs 16ᵃ so as to move the shifter A to mid position and lock it in such position, thereby moving the shifting gear *a* into the neutral position shown in Fig. 7, further rearward movement of the selector head causing the arm 14 to strike the dog 14ᵃ and move the shifter B in a direction opposite to that indicated by the arrow *w*, Fig. 13, until the bar 26 assumes the position shown in Fig. 7, thereby carrying the shifting gear *b* into mesh with the pinion 38 whereby said gear *b* will be driven through the medium of said pinion 38 from the spur wheel 37 so as to reverse the direction of movement of the transmission shaft 20.

If at any time through carelessness or inadvertence, the selecting arm 10 is improperly set, that is to say, placed midway between two of the graduations upon the indicator 10ᵃ and the attempt is made to shift the gears, they will be adjusted to neutral position, and, as no power will be applied to the transmission shaft upon the engagement of the clutch members 3, 3ᵃ, the driver will know that a mistake has been made. If, for instance, the indicator arm 10 has been moved so as to bring the selector head 12 into such position that the arm 14 is midway between the dogs 14ᵃ and 14ᵇ and the arm 15 is midway between the dogs 15ᵃ and 15ᵇ, the rearward movement of the selector head will cause the arms 14 and 15 to strike the dogs 14ᵃ and 15ᵃ simultaneously, thereby preventing movement of the shifter from its neutral position in either direction. If it was before in neutral position, or stopping the movement of the dogs 14ᵃ and 15ᵃ by simultaneous contact of the same with the arms 14 and 15 so as to prevent the movement of the shifter beyond a neutral position if it was originally in one of the extreme positions.

If it is desired to secure a direct thrust upon the selector head 12, the sleeve 7 and coiled spring 9 may be eliminated, the forward end of the shaft 8 being pivotally connected to the arm 6 on the shaft 5ᵃ, but we prefer to use the construction shown, as the interposition of the coiled spring 9 between the collars on the sleeve 7 and shaft 8 prevents the shifters A and B from being subjected to undue shock should the clutch pedal be suddenly and viciously pushed down.

While we have illustrated our invention as applied to a car equipped for three speeds forward and one reverse, it is to be understood that we do not limit ourselves to such construction, as our invention may, by simple multiplication of parts, be applied to cars having a greater number of speeds, or the invention may be applied to speed changers generally wherever they may be used.

We claim:

1. The combination, in a speed changing device, of a gear train having a movable member, and a shifting device for said movable member comprising a rocking element connected to said movable member, and a selector movable from and toward said rocking element, the latter and the selector having on opposite sides of the axis of the rocking element engaging members, the engaging member on one side of the axis of the rocking element projecting to a greater extent than the engaging member on the opposite side thereof.

2. The combination, in a speed changing device, of a gear train having a movable member, and a shifting device for said movable member comprising a rocking element connected to said member, and a selector movable from and toward said rocking element and also movable laterally in respect thereto, said rocking element and selector having engaging members on opposite sides of the axis of the rocking element, and one of said parts having the engaging elements on each side of the axis disposed in pairs one alongside of the other, one of a pair projecting to a greater extent than the other, and the engaging element of greatest projection on one side of the axis being in line with the engaging element of least projection on the opposite side of said axis.

3. The combination, in a speed changing device, of a plurality of gears, a member movable into engagement with either, a shifting device for said movable member having dogs corresponding to the different positions thereof, and a movable selector adapted to engage with either of said dogs to shift the movable member to its different positions, and other dogs carried by the shifter and serving to engage said selector so as to stop further movement of the same when the desired shift of the movable member has been effected.

4. The combination, in a speed changing device, of a gear train having a movable member, and a shifting device for said movable member comprising a rocking element connected to said movable member, and a selector movable from and toward said rocking element, two laterally separated sets of engaging elements on said rocking element and selector, each set of engaging elements having members on opposite sides of the axis of the rocking element, and the members of one set projecting to a greater extent on one side of the axis than on the other side of the same.

5. The combination, in a speed changing device, of a gear train having a movable member, and a shifting device for said movable member comprising a rocking element connected to said member, and a selector movable from and toward said rocking element, and also movable laterally in respect thereto, said rocking element and selector each having two sets of laterally separated engaging elements, each having members on opposite sides of the axis of the rocking element, one set of engaging elements being disposed in pairs one alongside of the other and one element of each pair projecting to a greater extent than the other, the engaging element of greatest projection on one side of the axis being in line with the engaging element of least projection on the opposite side of said axis.

6. The combination, in a speed changing device, of a gear train having two movable members, two shifting devices, one for each of said movable members, and each comprising a rocking element having thereon shifting dogs and neutralizing and locking dogs, and a selector movable from and toward said rocking elements and having two sets of arms so disposed that one set will act upon the neutralizing and locking dogs of one rocking element before the other set acts upon the shifting dogs of the other rocking element.

7. The combination, in a speed changing device, of a gear train having a plurality of movable members, shifting devices, one for each of said movable members and comprising a plurality of rocking elements disposed side by side and each connected to its corresponding movable member of the gear train, and each having a set of shifting dogs and a set of neutralizing and locking dogs, and a selector movable from and toward said rocking elements and also movable laterally in respect thereto, said selector having central arms for acting upon the shifting dogs of either of said rocking elements and side arms, those on one side acting on the neutralizing and locking dogs of one rocking element and those on the other side acting on the neutralizing and locking dogs of the other rocking element.

In testimony whereof, we have signed our names to this specification, in the presence of two subscribing witnesses.

HENRY W. VAN LEIR.
URIAH D. GARVER.

Witnesses:
KATE A. BEADLE,
HAMILTON D. TURNER.